US006940952B1

(12) United States Patent
Kleinfelter et al.

(10) Patent No.: US 6,940,952 B1
(45) Date of Patent: Sep. 6, 2005

(54) SYSTEM AND METHOD FOR EFFICIENT PROVISION OF A VOICEMAIL MESSAGE INDICATOR SIGNAL OVER A COMPUTER DATA NETWORK

(75) Inventors: Kevin P. Kleinfelter, Atlanta, GA (US); Kim Littrell, Marietta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/202,005

(22) Filed: Jul. 25, 2002

(51) Int. Cl.[7] ............................................... H04M 1/64
(52) U.S. Cl. ................... 379/88.12; 379/88.17
(58) Field of Search .......................... 379/88.12, 88.17, 379/88.22, 88.23, 88.25, 88.27, 900, 67.1; 709/203, 206, 209, 200–202, 228; 370/351–356, 428, 429; 707/8, 104

(56) References Cited

U.S. PATENT DOCUMENTS

| | | | | |
|---|---|---|---|---|
| 5,675,507 A | * | 10/1997 | Bobo, II | 709/206 |
| 5,963,618 A | * | 10/1999 | Porter | 704/270.1 |
| 6,052,367 A | * | 4/2000 | Bowater et al. | 370/352 |
| 6,181,781 B1 | * | 1/2001 | Porter et al. | 379/88.17 |
| 6,282,269 B1 | * | 8/2001 | Bowater et al. | 379/88.17 |
| 6,282,270 B1 | * | 8/2001 | Porter | 379/88.17 |
| 6,421,545 B1 | * | 7/2002 | Christal | 455/566 |
| 6,421,708 B2 | * | 7/2002 | Bettis | 709/206 |
| 6,623,127 B2 | * | 9/2003 | Bhat | 353/65 |

* cited by examiner

*Primary Examiner*—Roland Foster
(74) *Attorney, Agent, or Firm*—Bambi F. Walters; Scott Zimmerman

(57) ABSTRACT

A system and method for providing an indication of a telephone voicemail message over a computer network is provided. A table of updated voicemail subscriber message information is generated that includes voicemail subscriber identifier information and voice mailbox message status for each respective subscriber. Web-based requests are received from subscribers for voice mailbox status information. For each request from a subscriber, subscriber-specific data is retrieved from the table and an Internet web page incorporating the retrieved information is provided. A web page is then generated for a subscriber and downloaded over the subscriber's web browser to provide an updated voice mailbox message status. An additional embodiment is described in which a cache in the router is utilized to store updates of the voice mailbox message status.

3 Claims, 7 Drawing Sheets

SYSTEM AND METHOD FOR EFFICIENT PROVISION OF A VOICEMAIL MESSAGE INDICATOR SIGNAL OVER A COMPUTER DATA NETWORK

BACKGROUND

FIELD OF THE INVENTION

The present invention relates generally to the field of telephony network voicemail messaging systems, and more particularly to the provision of voicemail message waiting indicator signals to users of a computer data network.

BACKGROUND OF THE INVENTION

Voice messaging services generally fall into two categories. First, answering machines or other customer premises equipment ("equipment") may be connected directly to a telephone subscriber's telephone line. Such devices record messages from callers if a call has not been answered after a pre-determined number of ring-intervals. Typically, the equipment provides a visual and/or audible message waiting indicator to alert the subscriber that a message has been received. However, a drawback to such equipment-based systems is that calls must be received by the subscriber's equipment before callers can leave a message. Accordingly, such equipment is not useful for recording messages when a caller receives a busy signal. To overcome this problem, among others, telephone service providers have implemented the second category of voice messaging service: telephony network-based voicemail messaging server ("VMS") systems.

In a telephony-based VMS system, when a call is not answered or cannot be connected to a subscriber's telephone line, intelligence within the telephone network routes the call to a centralized VMS system. The advantages of such centralized telephony-based VMS services are well-known in the art. For example, the subscriber may receive voicemail messages while he is using his telephone line to speak to another person or for a connection to an online data service. Moreover, because of the centralized nature of the VMS system, the telephone service provider may provide power and data system backups to increase reliability and availability of the VMS system. However, such telephony-based VMS systems have difficulty notifying the subscriber when he has new messages waiting to be heard on the server.

FIG. 1 is a schematic diagram depicting a conventional system for alerting a telephony-based voicemail subscriber that a voice mail message has been received on the telephony voicemail system. In FIG. 1, voicemail messages are processed and stored in telephony network 100 by VMS 102. When a caller leaves such a voicemail message for a subscriber, VMS 102 alerts the subscriber via central office 104. Central office 104 sends a signal to the subscriber's telephone to provide an alert to the subscriber. If the telephone is part of an integrated system, such as telephone 106, a voicemail message waiting indicator ("MWI") may be displayed or provided directly on the telephone device. Alternatively, a separate MWI system 108 may be attached to telephone 110, as shown in FIG. 1. Central office 104 may also generate a pre-determined tone (e.g., "stagger tone") on the subscriber's line to alert the subscriber that a message has been received.

Because the conventional MWI system as shown in FIG. 1 relies on the subscriber's equipment, it suffers from some of the same problems as described above for conventional answering machines. That is, although callers now may leave a voicemail message through the centralized VMS system even when the subscriber's telephone line is unavailable (speaking with another caller or using an online data service) the subscriber's telephone line must be available to send a notification signal to the equipment. Thus, if the line is busy, the subscriber will not be informed when new messages are waiting on the voicemail server.

FIG. 2A depicts a conventional system by which message waiting indicators can be provided to a subscriber while connected to an online data service, via a display on the computer that is connected online. Such a system may be useful, for example, when the subscriber's telephone line is unavailable to callers because it is connected to data network 202 using a dial-up connection. In such a situation, the conventional MWI system shown in FIG. 1 does not enable the central office to send the MWI signal over the subscriber's telephone line until after the subscriber has disconnected from the data network. With this system, as shown in FIGS. 2A–2C, the subscriber can be notified fairly quickly of a new voicemail message even while online, through notification over a computer network to the subscriber's computer.

The conventional system of FIG. 2A includes client computer 200 and voicemail server system 206. Client computer 200 can include a processor 220 coupled via bus 222 to network port 224, and memory 226. Specialized software is installed in memory 226 of client computer 200 for connecting to voicemail server system 206 to receive MWI information on the client computer 200. Client computer 200 can communicate with voicemail server system 206 via network 202. Server 206 can include a processor 230 coupled via bus 232 to network port 234, and memory 236.

In this system, a message waiting indicator may be sent from VMS system 204 to server system 206 for transmission over network 202 to client 200, as shown in FIG. 2A. Server 206 includes database 209 for storing and processing MWI messages received from VMS 204. Alternatively, VMS system 204 may be connected within network 202 and configured to send message waiting indicators directly to client 200. In either case, special software installed on client computer 200 opens a connection to server 206 when the subscriber logs onto network 202. In response to this open connection, server 206 sends MWI messages to client computer 200. These messages are to be sent periodically in accordance with the specialized software, upon requests from client computer 200.

In a conventional TCP/IP socket-based system, this can be accomplished by the client opening a TCP connection to a predefined port on the server 206 and waiting for data to arrive via that connection. The server responds with a record of a predefined format, with content indicating whether a message is waiting. The client computer 200 continues to monitor the connection for additional records, in case that a message is received subsequent to a request.

The specialized client software may operate in any suitable manner to display the alert message to the subscriber via display area 208 on client 200. For example, in FIG. 2B, a small client window 210 may be opened in a non-intrusive place within display 208. In this example, the specialized client software runs independently of any other applications. That is, window 210 need not be run from within another application and the window may be moved and resized according to the subscriber's preferences. Window 210 may provide a graphical or textual indicator to alert the subscriber. Alternatively, computer 200 may provide an audible indicator. As another example, an icon may be incorporated into the system tray or other display location in display area 208. For example, icon 212 on system menu bar 214 may be used, as shown in FIG. 2B. Icon 212 may be further configured to blink or change colors to indicate that a message waiting indicator signal has been received.

FIG. 2C depicts a display on a client computer based upon specialized software for providing MWI information over a web browser. In this configuration, web browser 216 is opened in display area 208, and server 206 includes a web server to provide web pages to the web browser. The client software may be implemented using Java or a comparable applet technology (also referred to as "mobile code") embedded in web browser application 216. The applet may display a message in a frame or other area 218 on web browser 216.

In the above-described conventional systems, a subscriber's client computer has specialized software installed to directly retrieve information over a network from voicemail system 204 through server 206. While this may allow for a direct connection, there are also disadvantages associated with requiring special software to be installed to receive MWI messages over a network to a client computer. Particularly, many computing devices do not support installed client applications. For example, Internet Appliances that operate almost exclusively for browsing the Internet may not allow users to load client programs for persistent memory. As another example, computers located behind corporate firewalls may not permit traffic flow other than HTTP. Although it is possible that a Java applet or similar code module could be downloaded across a network as necessary, Java applets will not run unless the client computer has other software installed, such as a Java Virtual Machine or a Macromedia Flash runtime system. In any event, Java applets are known to be slow to execute and slow to download via limited bandwidth connections. Accordingly, a need exists for a system and method for providing a voicemail message waiting indicator to subscribers without the need for special software on the client's computer.

SUMMARY OF THE INVENTION

Systems and methods for providing a voicemail message indicator to client devices are disclosed herein. In a disclosed embodiment, a server system, referred to herein as a MWI proxy server, is operable to communicate with client devices such as computers behind a firewall, PDA's, or a mobile phone, any of which may not have persistent IM client software thereon. A client device may receive MWI information by contacting the MWI proxy server, which acts as a go-between with a MWI server and voicemail system. The MWI proxy server forwards requests for MWI information originating from the client to the MWI server. Likewise, the MWI proxy server receives MWI information from the MWI server and makes it available to the client device.

In a disclosed embodiment, a client device, which may be any computing device such as, for example, a general purpose computer, a personal digital assistant, or a mobile telephone, transmits a request to the MWI proxy server to receive MWI information. The MWI proxy server responds to the device by transmitting HTML code for creating a frame in the web browser. The frame is defined such that it repeatedly and at a defined periodicity requests that the displayed frame be refreshed. Thus, the frame periodically transmits requests to the MWI proxy server for refreshed frames with updated MWI information.

According to an aspect of the disclosed system, the functionality of the MWI proxy server may be provided via a plurality of distributed servers. For example, a plurality of servers, referred to herein as cache servers, may be established for fielding requests to update MWI information in a frame in a web browser. Requests from client devices for recently received MWI information may be re-routed according to network routing rules to an appropriate cache server.

It is an object of the present invention to provide a method for providing an indication of a telephone voicemail message over a computer network. A table of updated voicemail subscriber message information is generated that includes voicemail subscriber identifier information and voice mailbox message status for each respective subscriber. Web-based requests are received from an MWI proxy server for voice mailbox status information. For each request subscriber-specific data is retrieved from the table and an Internet web page incorporating the retrieved information is then generated for the subscriber and downloaded over the subscriber's web browser to provide an updated voice mailbox message status.

It is also an object of the present invention to provide a method for accessing an indication of a telephone voicemail message over a computer network. A request is transmitted to a web server for voice mailbox status information. A table is accessed that contains updated voicemail subscriber message information, having subscriber identifier information and voice mailbox message status for each respective subscriber. Subscriber-specific data is retrieved from the table and provided in an Internet web page incorporating the retrieved information.

Yet another object of the invention is to provide an indication of a telephone voicemail message over a computer network upon receiving a request from a subscriber's browser for the subscriber's voicemail message indicator in a router of a network. A database check is performed in a cache connected to the router to search for the requested subscriber information. If the requested subscriber information is included in the cache, the voicemail message indicator is provided to the subscriber. Otherwise a connection is routed to a web server that maintains a database of subscriber-specific voicemail message indicators.

DETAILED DESCRIPTION OF THE INVENTION

The present invention provides a web-based voicemail message waiting indicator to a subscriber's client computer without the need for specialized software on the client computer. Using the method and system described herein, a voicemail subscriber who can access the Internet can receive notifications of when voicemail messages are left in the subscriber's voicemail box. This can be useful if the subscriber is currently occupying the telephone line, perhaps to access the Internet. Additionally, the present invention can be utilized to provide such information to the subscriber's PDA or wireless telephone, which may be useful to the subscriber even if the user is not using the telephone line to access the Internet. Therefore, if a voicemail subscriber is waiting to receive a voicemail message, but is away from the telephone line, the voicemail subscriber can receive notification of incoming voicemail messages on the subscriber's web-enabled PDA or wireless telephone.

Figure 1:
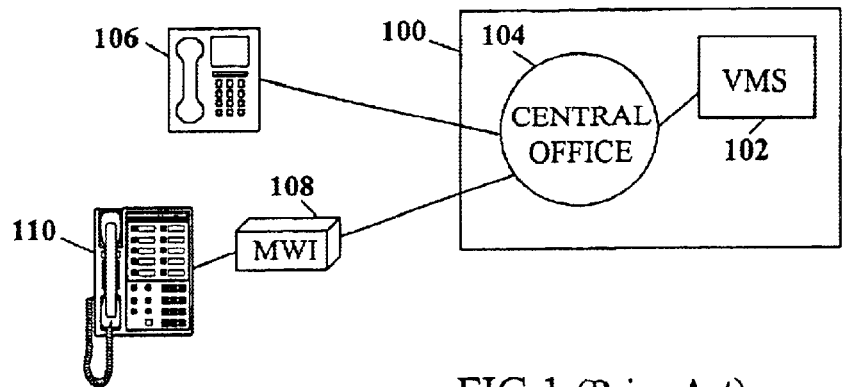
FIG. 1 is a schematic diagram of a conventional voicemail message waiting indicator system for providing an alert to a subscriber's equipment.
Figure 2A:
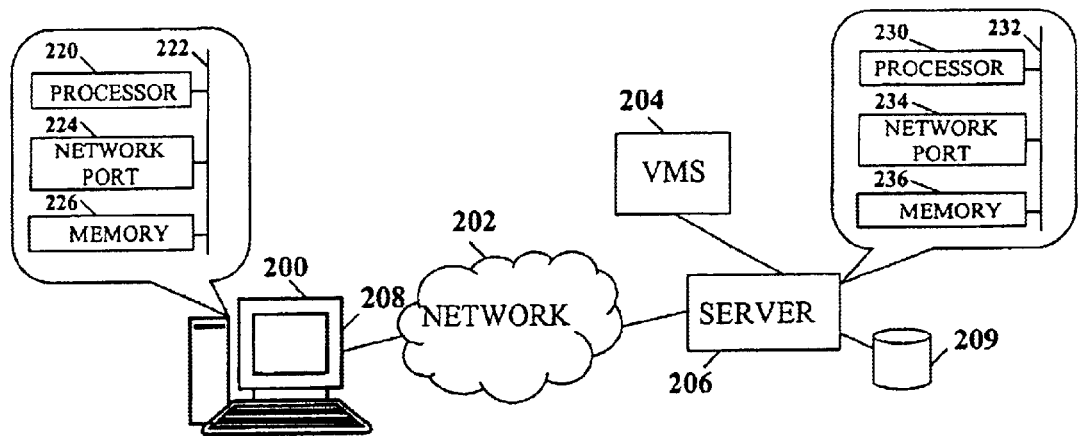
FIG. 2A is a schematic diagram of a conventional voicemail message waiting indicator system for providing an alert to a subscriber's computer system.
Figures 2B, 2C:
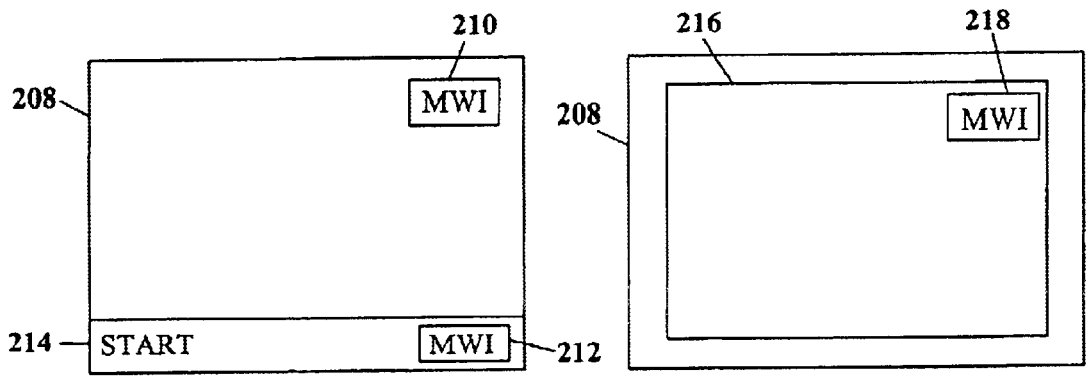
FIG. 2B is an illustration of a display for a conventional voicemail message waiting indicator application executed on a client computer system.
FIG. 2C is an illustration of a display for a conventional voicemail message waiting indicator application provided via a web-based client application executing on a client computer system.
Figure 3A:
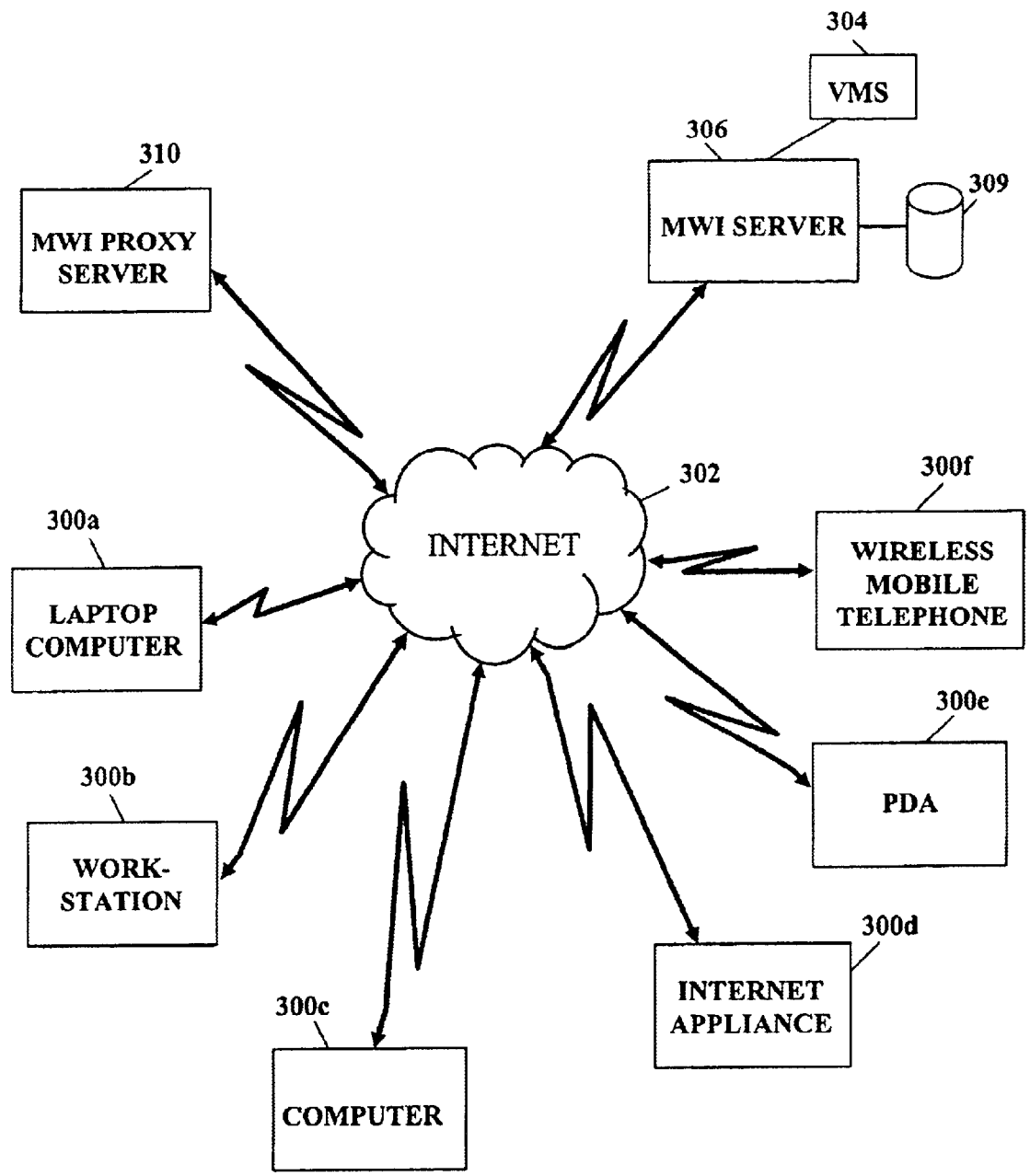
FIG. 3A is a schematic diagram of an architecture according to an embodiment of the present invention, in which a client computer accesses message waiting indicator information from a server system.

In one aspect of the present invention, a system and method are described for providing a voicemail message waiting indicator to a subscriber via a conventional web browser. By configuring the system to provide MWI messages to conventional browsers, such as Internet Explorer or Netscape, difficulties associated with configuring special software can be obviated. FIG. 3A depicts a web browser environment in which the above-described problems may be overcome by downloading a page of data from database 309 on server 306. The page of data may include a message waiting indicator associated with the subscriber and may be provided to the subscriber in any suitable manner, including, for example, as a text or icon-based message or an audio or video message. The association between the subscriber and the server may be made, for example, via an Internet "cookie," a log-in procedure, or a network address assigned to any of client devices 300a–300e. Network traffic between client 300a–300e and network 302 are processed by MWI proxy server 310.

As shown in FIG. 3A, MWI proxy server 310, which may be, for example, a general purpose computing system, is communicatively coupled to network 302. MWI proxy server 310 acts as a go-between for MWI server 306 and devices 300a–f. As examples, PDA 300e and mobile telephone 300f may have limited memory capacity and therefore may not have capacity for MWI specialized software to reside thereon. Likewise, Internet Appliance 300d may not support persistent MWI software. Computing System Workstation 300b may be located behind a corporate firewall or operate in a high-security mode, such as in a lab or as a public kiosk, and therefore may not be operable to communicate via a persistent specialized MWI software. Thus, PDA 300e, Wireless Mobile Telephone 300f, Workstation 300b and Internet Appliance 300d may not be operable to directly request MWI information from MWI server 306. MWI proxy server 310 operates to allow such devices to receive such information.

Generally, devices 300a–f have web browsing software thereon and can be used to traverse or "Surf" the World-Wide-Web (i.e., "the web"). MWI proxy server 310 is equipped as a web server and therefore can be accessed using conventional web browsing software on devices 300a–f. Devices 300a–f are operable to browse to MWI proxy server 310 and navigate a log-in procedure. Specifically, the devices may be used to navigate to an initial HTML sign-in web page on MWI proxy server 310. The operator of devices 300a–f enter identification information into the sign-in screen and forward the same to MWI proxy server 310, which verifies the information by transmitting the request to MWI server 306. Once the device is signed-in, communications with that device occur through MWI proxy server 310.

Figure 3B:
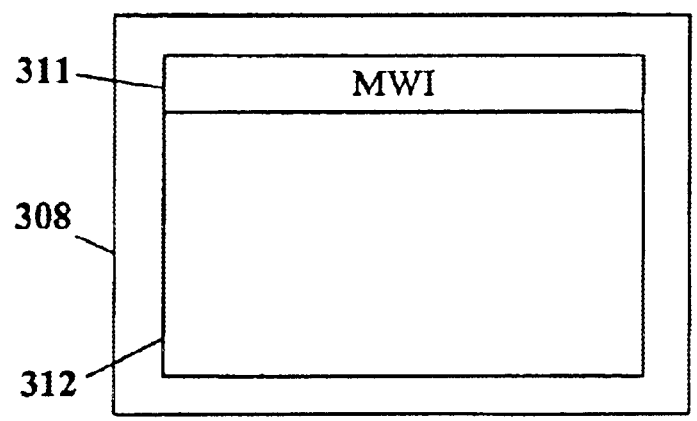
FIG. 3B is an illustration of an exemplary display for the system of FIG. 3A, in which a voicemail message waiting indicator is provided in a frame on a web browser.

Assuming that the user is a valid voicemail subscriber, MWI proxy server 310 communicates instructions to the browser software, which may be in the form of HTML code, instructing the device to create a frame 311 on a client display area 312 of a client display 308, as shown in FIG. 3B. The MWI proxy server 310 creates a frame, rather than an entire web page, such that a user can continue to browse the World-Wide-Web and access other web pages while still displaying the frame created by the MWI proxy server 310.

The frame is programmed to periodically request a refreshed web frame from MWI proxy server 310 so as to alert the user of any new incoming voicemail messages since the last refresh. The frame may be programmed to refresh about every few seconds or minutes, depending upon whether it is critical to be notified immediately of an incoming message. As an alternative embodiment, a user can be prompted upon sign-in to indicate how often to refresh the MWI message frame, or to opt for high, medium, or low priority. Depending upon the speed of the user's connection to the Internet, choosing to receive refreshes as a high priority at every few seconds may delay downloads of other web pages while browsing the Web. Therefore, users may wish to elect "low" or "medium" priority if they are not expecting to receive an urgent call.

MWI proxy server 310 tracks refresh requests received from client devices 300a–f. This tracking information is used to determine whether the user has browsed away or discontinued an Internet connection. For example, if the refresh interval is every 2 minutes, after 5 minutes of no requests, the MWI proxy server 310 determines that the user has ended the session and informs the MWI server 310 that the user has signed-off. MWI server 306 may then terminate the session.

Those skilled in the art will recognize that the functionality described herein provided by MWI proxy server 310 may in fact be distributed to a plurality of physical machines. For example, servicing requests for updated web frames may be performed by a plurality of server machines. As previously noted, devices 300a–f receive MWI alerts when web browser frame 311 thereon requests an updated web page from MWI proxy server 310. Under circumstances where only a few devices communicate with MWI proxy server 310 to receive voicemail alerts, it is reasonable that MWI proxy server 310 service all requests to refresh web frames.

Figure 4:
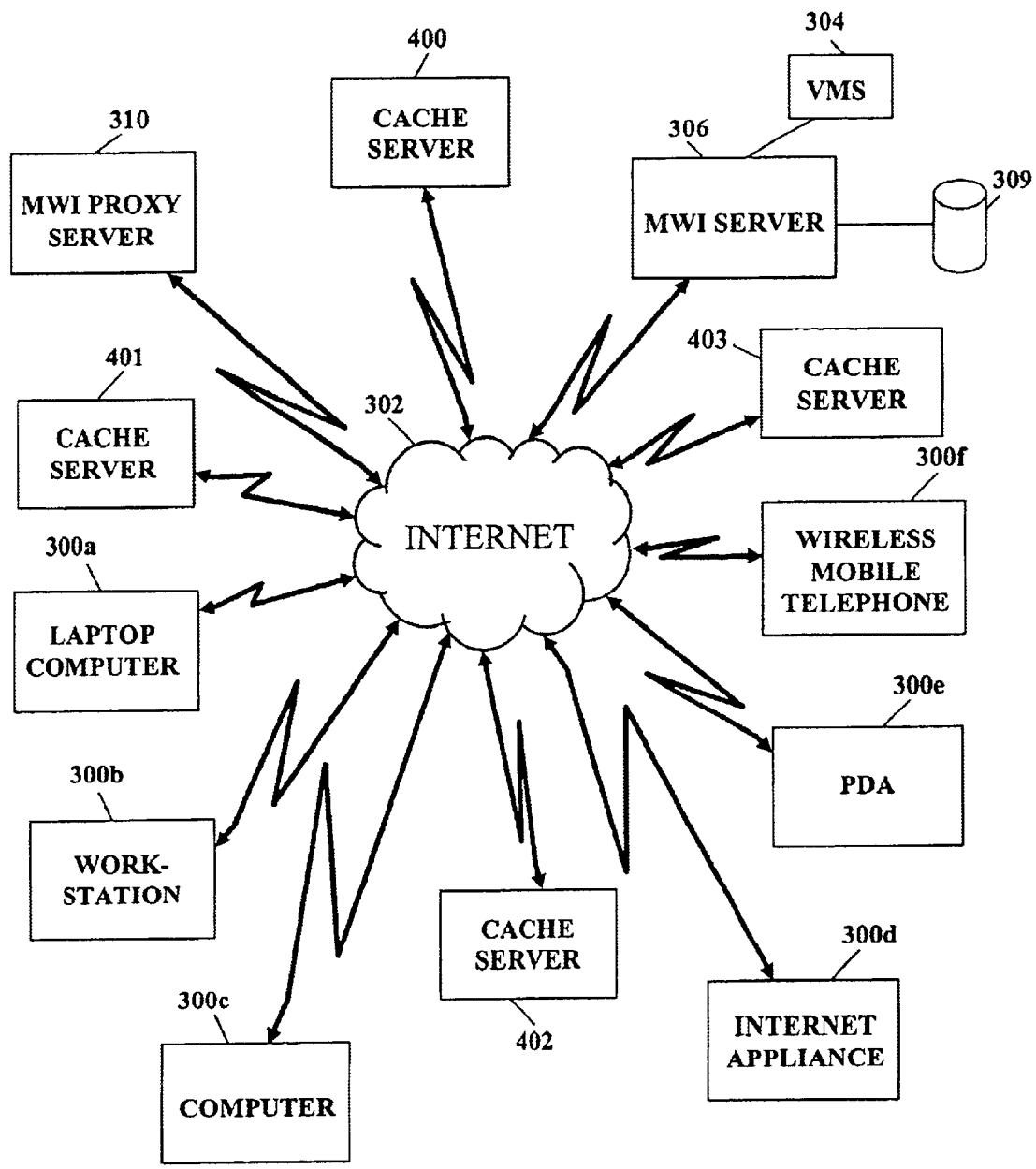
FIG. 4 is a schematic diagram according to an embodiment of the present invention of a network architecture using a distributed caching system to reduce bandwidth on a network providing a voicemail message waiting indicator service.

FIG. 4 is a schematic diagram of the network system in FIG. 3A, adding a plurality of cache servers to reduce network usage. Where a great number of devices sign-in through MWI proxy server 310, a plurality of servers 400–403, referred to herein as cache servers, may service requests from devices 300a–f for refreshed web frames. When cache servers 400–403 are employed to service web frame refresh requests, MWI proxy server 310 forwards MWI updates to the cache servers as they are received. The requests for web frames with updated information may then be processed at cache servers 400–403. The MWI proxy server will continue to send updated information to the cache servers for particular subscribers while the subscribers remain active on the network. This information is then sent to subscribers in response to respective requests automatically generated from the subscribers' browsers. If no subsequent requests are received from a particular subscriber's browser within a certain period of time, the system "times out," indicating that the subscriber is no longer active, and notification is provided to the MWI proxy server to discontinue sending MWI updates to the cache server.

Those skilled in the art will recognize that while the requests from devices 300a–f for updated web frames may be addressed to MWI server 306, they may be re-routed to an appropriate cache server 400–403 according to networking rules. For example, router tables located in routers throughout the network may define rules identifying a particular cache server 400–403 for servicing requests from a particular set of client devices, e.g., clients with an IP address within a particular range. These rules have the effect of routing requests that may originally be directed to MWI proxy server 310 to cache servers 400–403.

Figure 5:
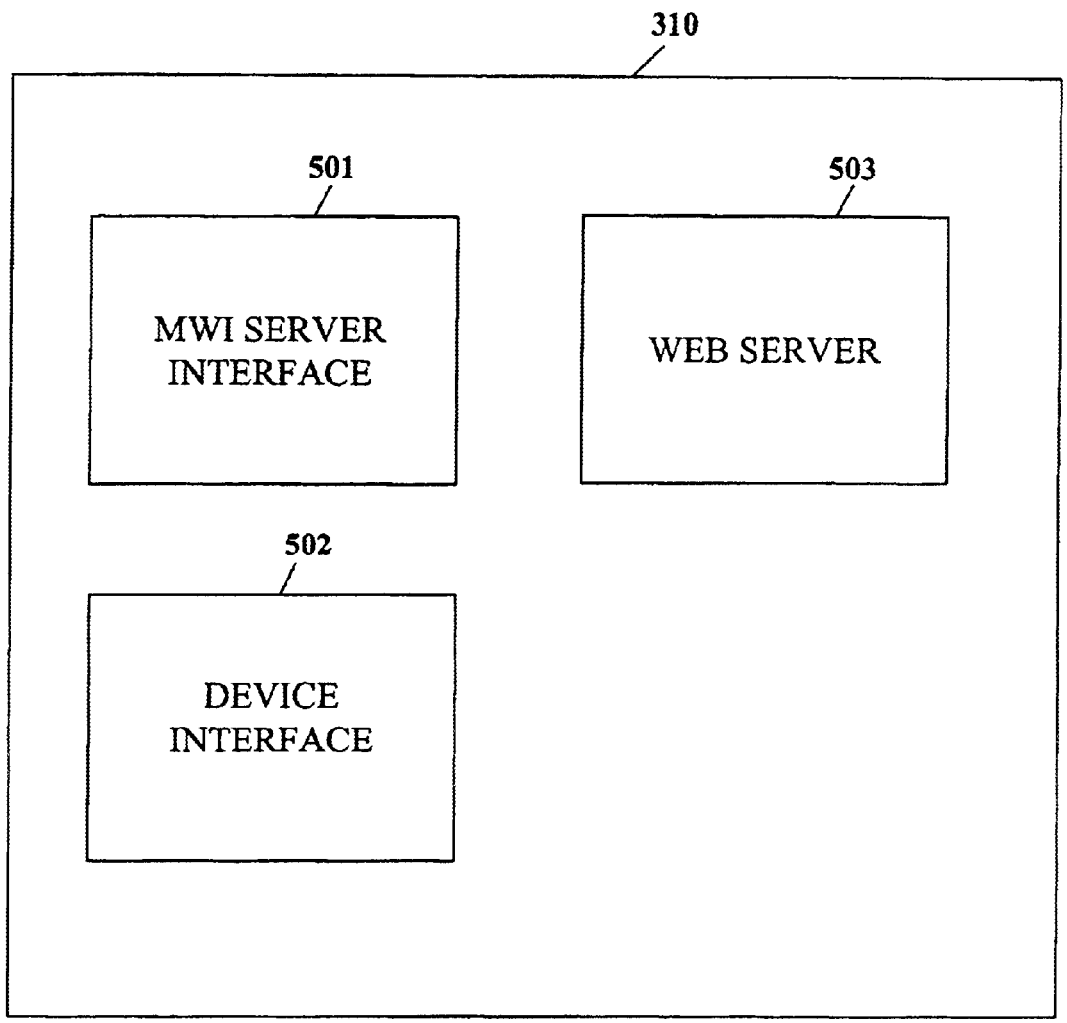
FIG. 5 is a schematic diagram of a proxy server for providing message waiting indication information according to an embodiment of the present invention.

FIG. 5 provides a diagram depicting functional components of MWI proxy server 310. As shown, MWI proxy server 310 comprises an MWI server interface 501 for interfacing with MWI server 306. Generally, interface 501 is operable to communicate with MWI server 306 so as to register devices with the MWI online notification service.

MWI proxy server 310 may also comprise web server 503. Web server 503 is operable to receive and respond to requests for web frames. Web server functionality is necessary for interfacing with clients that use the proxy functionality of MWI proxy server 310.

Device interface 502 provides an interface to devices such as PDA 300e, Wireless Telephone 300f, Internet appliance 300d, laptop 300a, Workstation 300b, and computing system 300c that initiate sessions through MWI proxy server 310. Device interface 502 operates to receive requests to establish sessions and forward corresponding requests to MWI server 306. More particularly, proxy device interface 502 is operable to format received requests for web frames and upon receiving requests for such frames, transmit it to the requesting device via web server 503, based upon updates received from MWI server 306.

Figure 6:
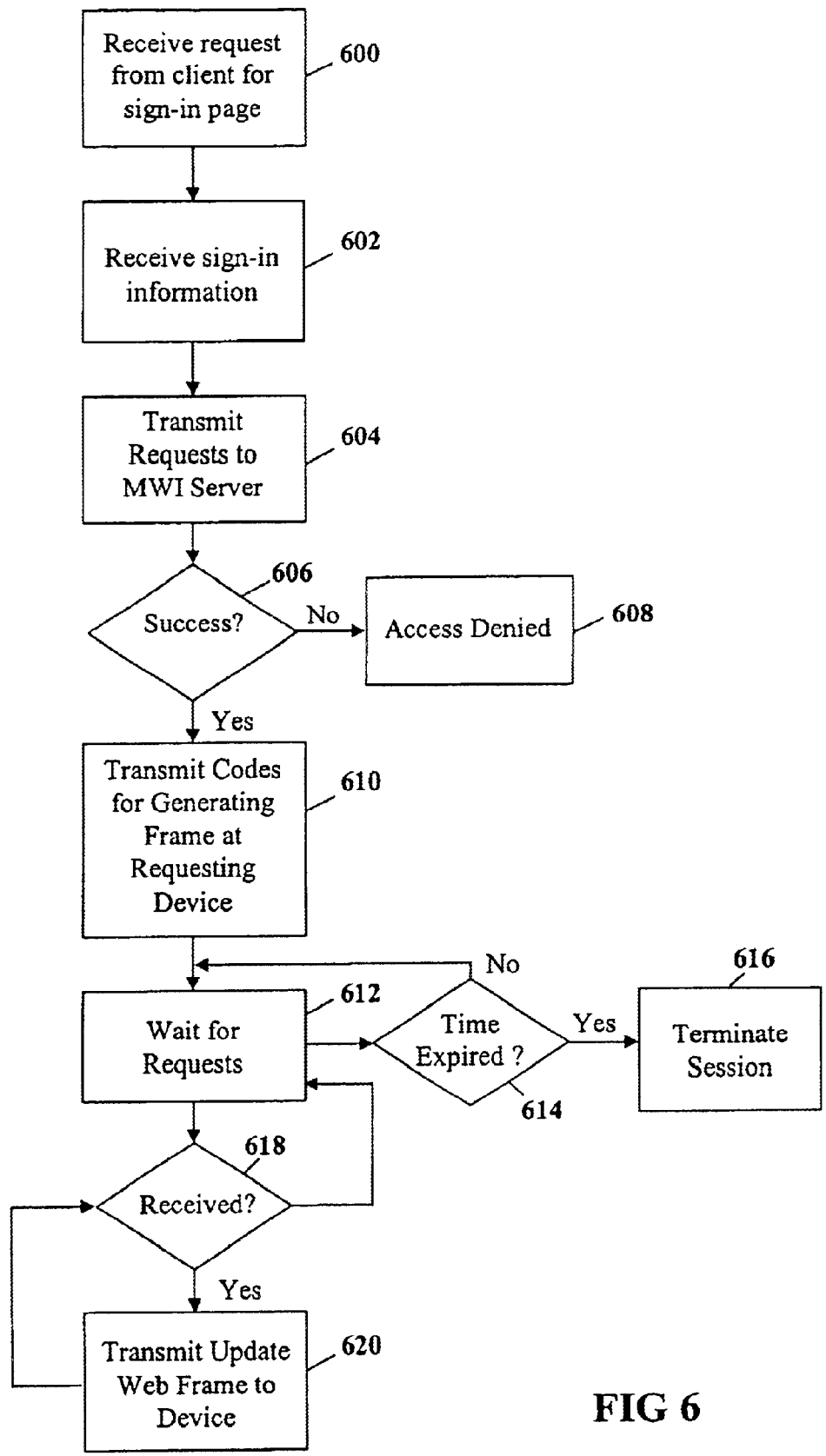
FIG. 6 is a flow diagram of a process to be performed by a proxy server according to an embodiment of the present invention.

FIG. 6 provides a flow diagram of steps performed by MWI proxy server 310. As shown in step 600, MWI proxy server 310 receives a request for a sign-in page from a client device, such as computing system 300c. The sign-in page is then forwarded to the client (not shown). Optionally, the sign-in page allows the user to choose a preferred rate by which updates will be sent (e.g., every 10 seconds, once a minute, etc.). At step 602, the user's sign-in information is received (including username and password/passcode), and transmitted to the MWI server 306 in step 604 for verification. If the user chose a preferred update rate, this information is transmitted as well. The MWI server 306 checks database 309 (as shown in FIG. 3A) in step 606 to determine whether the user is an authorized voicemail subscriber. If incorrect information was provided, the system provides notification that access is denied in step 608, and may provide another opportunity to provide username and password/passcode information (not shown).

Once a subscriber is authorized, the MWI proxy server transmits codes to the device for generating frames, in step 610. The codes that are transferred by the proxy server enables the device to receive frames without having specialized software installed thereon.

In step 612, the MWI proxy server waits to receive requests from the authorized device. Depending how the frame is configured, requests for updates may occur several times a minute, once a minute, or at any other periodicity. A timer runs to detect whether requests are received within an acceptable range of times. If it is determined in step 614 the time has expired, the session is terminated in step 616. Since the Internet is a connectionless system, a system can only determine if a subscriber is still receiving information based upon the frequency of requests for updates. Although this could be determined by requesting that the user "sign-off," this rarely occurs.

Once a request is received in step 618 from a web browser on a subscriber's device, the proxy server retrieves the latest update information received from the MWI server 306. The update information, along with other information to be displayed in the frame, is then transmitted to the browser in step 620. The proxy server then continues waiting for the next request from the browser, in step 612.

Figure 7:
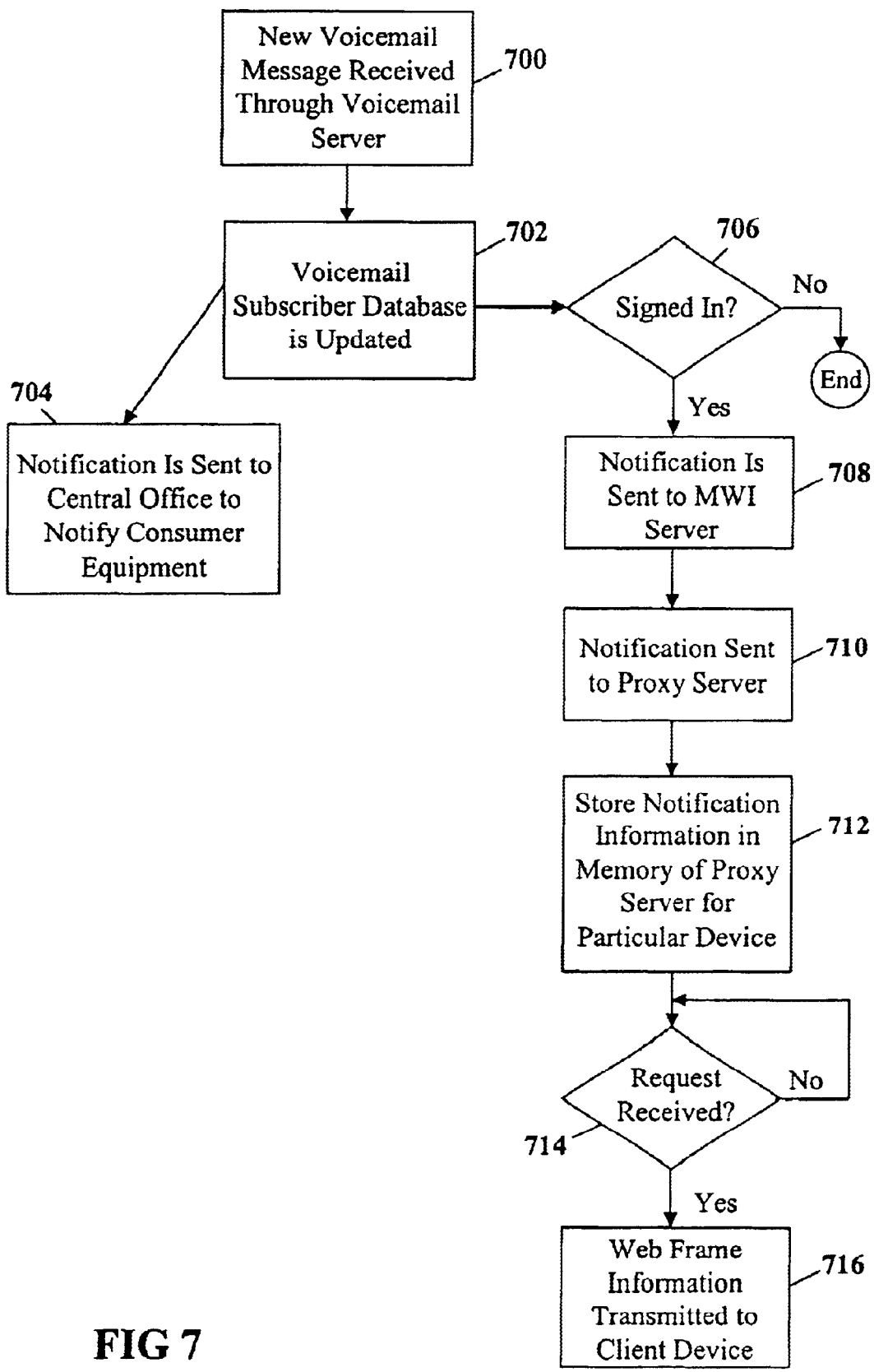
FIG. 7 is a flow diagram of a process by which a message waiting indicator is generated from a voicemail system and transmitted to a subscriber's client computer in accordance with an embodiment of the present invention.

FIG. 7 provides a flow diagram of how MWI information is transmitted from VMS 304 to the device (300a–f). In step 700, a new voicemail message is received through the voicemail system (VMS) 304. The voicemail subscriber database 309 is updated to include the received voicemail in step 702, and a notification is sent to a central office associated with the subscriber's telephone line in step 704. Depending upon whether the subscriber has an integrated system, the notification is then provided as a "staggered dial tone" or as a visual indicator on the subscriber's telephone equipment. However, if the user is either (i) using the telephone line with a dial-up modem to access the Internet online or (ii) away from the telephone, this notification might not be useful to alert the subscriber. Accordingly, after determining in step 706 whether the user has signed-in, the notification is sent to the MWI server in step 708. MWI server then transmits the MWI notification information to MWI proxy server over the Internet, in step 710. This information may be transmitted immediately, or otherwise as part of a batch processing with information for other subscriber voicemail systems.

Once the information is received by the MWI proxy server, it is temporarily stored, in step 712, until a request is received by the respective client, in step 714. The information is stored such that it is associated with a particular identification code for the respective client. The request includes a particular IP address and the identification code, which triggers the proxy server to transmit information in step 716 to enable the client device to generate the web page frame containing the respective update information.

The above described steps in FIGS. 6 and 7 may be performed by a plurality of server machines. Notably, the steps of handling requests to forward MWI information may be performed by a plurality of servers such as, for example, cache servers described in connection with FIG. 4. Requests by devices for these updates are routed to the appropriate cache server via network enforced rules. Employing cache servers 4 relieves a single machine from performing a function that will likely be performed a great number of times. Further, cache servers may be positioned in the network so as to be close to devices that may be frequently accessing them.

The present invention provides a web-based voicemail message waiting indicator to a subscriber's client computer without the need for specialized software on the client computer. The invention further reduces the load on the service provider's network by moving the data to distributed systems on the network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing an indication of a telephone voicemail message over a computer network, comprising the steps of:

receiving a request in a cache server in a network from a subscriber's browser for voicemail message waiting indicator information associated with the subscriber, wherein the request is directed to an http-based proxy server and redirected to the cache server;

notifying the proxy server of the subscriber's request;

while the subscriber remains active, receiving in the cache server voicemail message waiting indicator information associated with the subscriber from the proxy server, wherein the voicemail message waiting indicator information is pushed to the cache server, and the proxy server retrieves the message waiting indicator information from a voicemail server;

determining whether requests are received within an acceptable range of time, wherein no requests received during the acceptable range of time indicates that the subscriber is no longer active and;

upon receiving an indication that the subscriber is no longer active, notifying the proxy server to discontinue sending the voicemail message waiting indicator information to the cache server.

2. The new method of claim 1, wherein the subscriber's browser resides on a web-enabled personal digital assistant.

3. The method of claim 1, wherein the subscriber's browser resides on a web-enabled wireless telephone.

* * * * *